US011282189B2

(12) United States Patent
Swanson et al.

(10) Patent No.: US 11,282,189 B2
(45) Date of Patent: Mar. 22, 2022

(54) UNSUPERVISED CLUSTERING TO IDENTIFY ANOMALIES

(71) Applicant: Intel Corporation, Santa Clara, CA (US)

(72) Inventors: John A. Swanson, Forest Grove, OR (US); Kenny K. Toh, Portland, OR (US); Kumara Sastry, Hillsboro, OR (US); Lillian Chang, Portland, OR (US); Manuj Swaroop, Beaverton, OR (US); Vivek K. Singh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 16/572,594

(22) Filed: Sep. 16, 2019

(65) Prior Publication Data

US 2020/0013157 A1    Jan. 9, 2020

(51) Int. Cl.
*G06T 7/00* (2017.01)

(52) U.S. Cl.
CPC ............ *G06T 7/001* (2013.01); *G06T 7/0006* (2013.01); *G06T 2207/10024* (2013.01); *G06T 2207/10061* (2013.01); *G06T 2207/30148* (2013.01)

(58) Field of Classification Search
CPC .................. G06T 7/001; G06T 7/0006; G06T 2207/10061; G06T 2207/10024; G06T 2207/30148; G06T 2207/20081; G06T 2207/20084

USPC .................................... 382/141, 149; 438/16
See application file for complete search history.

(56) References Cited

U.S. PATENT DOCUMENTS

| | | | | |
|---|---|---|---|---|
| 8,712,184 | B1* | 4/2014 | Liao | G06K 9/40 382/275 |
| 8,965,102 | B2* | 2/2015 | Tien | G06T 7/001 382/149 |
| 10,732,124 | B2* | 8/2020 | Halder | G01N 21/8851 |
| 2005/0002554 | A1* | 1/2005 | Schulze | G06T 7/001 382/144 |
| 2011/0054659 | A1* | 3/2011 | Carlson | H01L 21/67253 700/109 |
| 2012/0227017 | A1* | 9/2012 | Abdo | G03F 1/36 716/53 |
| 2017/0323435 | A1* | 11/2017 | Min | G06T 7/001 |
| 2017/0345725 | A1* | 11/2017 | Hu | G06T 7/001 |
| 2019/0095800 | A1* | 3/2019 | Asbag | G06N 5/022 |
| 2019/0277776 | A1* | 9/2019 | Gawhane | H01L 22/20 |

* cited by examiner

*Primary Examiner* — Sheela C Chawan
(74) *Attorney, Agent, or Firm* — Alliance IP, LLC

(57) ABSTRACT

Images are accessed representing a status in a fabrication of a semiconductor chip corresponding to a particular stage in the fabrication. Distortion is removed from the images and actual features of the semiconductor chip are extracted from the images. Synthesized ideal features of the semiconductor chip associated with completion of the particular stage in the fabrication are determined from the one or more images. The actual features are compared to the ideal features to determine whether anomalies associated with the particular stage exist in the semiconductor chip.

20 Claims, 12 Drawing Sheets

UNSUPERVISED CLUSTERING TO IDENTIFY ANOMALIES

TECHNICAL FIELD

This disclosure relates in general to the field of computer systems and, more particularly, to the unsupervised identification of anomalies in images, particularly for the use in integrated circuit development and testing.

BACKGROUND

Cutting-edge semiconductor manufacturing processes are terribly complex. Housed in billion-dollar factories and comprising hundreds of processing steps to yield a finished device, they are capable of reliably printing features as small as 10 nm hundreds of billions of times across wafers that extend a foot in diameter. Developing a new semiconductor manufacturing process requires defining a set of design rules that establish constraints that a semiconductor device must follow to ensure manufacturability. Process development also involves developing optical proximity correction (OPC) recipes that adjust physical design features before they are printed on a mask to help counter feature distortions caused by various processing steps.

Scanning electronic microscopy (SEM) images taken during wafer manufacturing can help identify physical design patterns and geometries that may explain manufacturing defects. These patterns and geometries can be used to help define the design rules and OPC recipes for a process. The manufacture of a single wafer can generate a large amount of SEM image data given the large wafer size and number of processing steps in modern processes. In some instances, millions of images, with petabytes of data, can be produced with SEM.

Given the large number of images, such as, for example, millions or more images, containing potentially petabytes of data, the ability to automatically detect anomalies in wafer processing can be critical to the process. Existing methods can't process petabytes of images, can't detect new, previously unseen anomalies, and can be prone to making errors in labeling previously seen anomalies.

BRIEF DESCRIPTION OF THE DRAWINGS

Like reference numbers and designations in the various drawings indicate like elements.

DETAILED DESCRIPTION

Figure 1A:
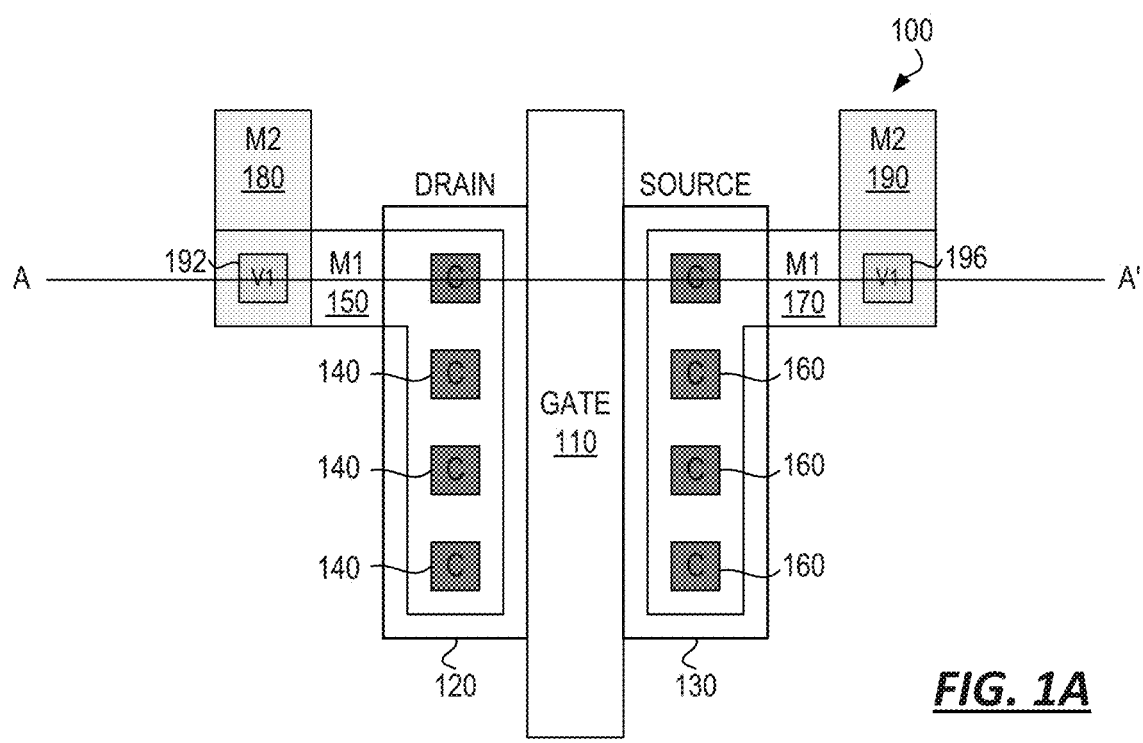
FIG. 1A illustrates the physical design of an exemplary planar transistor.

Semiconductor manufacturing has become increasingly complex over the years. Since the turn of the century, the minimum feature size has shrunk by over an order of magnitude as the industry has progressed from the 130 nm to 10 nm technology nodes. At the same time, processor complexity has dramatically increased. Current flagship products have transistor counts that well exceed 10 billion. To handle these reduced feature sizes and increased chip complexities, companies must invest billions of dollars and years of research to build state-of-the-art fabrication facilities. Research and development costs are driven ever-upward by the rising cost of increasingly sophisticated equipment needed for advanced processes. The industry has taken steps to decrease per-transistor manufacturing costs (for example, by moving from 200 mm to 300 mm wafers at the 90 nm technology node), but the overall trend has been for each process generation to cost more than the last. With up to hundreds of individual dies on wafers that span a foot in diameter, the total number of transistors that can be printed on a wafer is on the order of one trillion. Developing high-volume manufacturing processes that can reliably manufacture transistors at such an extreme scale presents considerable challenges.

One such challenge is discovering the patterns and geometries in a physical design responsible for limiting process yield. Manufacturing defects can be discovered through analysis of SEM (scanning electron microscopy) images generated during wafer manufacturing, but the amount of SEM image data that is to be analyzed to locate defects can be tremendous (up to millions of images and petabytes of data). As a process matures, the presence of a manufacturing defect in the mountain of SEM image data that can be generated may be a rare event. Finding a defect in the vast number of images is like finding a needle in a haystack.

The technologies described herein can detect the few anomalies, such as, for example, manufacturing defects, in a large collection of images. An unsupervised cluster method as described herein can automatically synthesize a set of ideal features that should be present in an image, iteratively extract features present on the image, removes image distortion from the image, and multi-resolution alignment methods to accurately align the extracted features with ideal features.

Feature extraction comprises automatically choosing an optimal combination of image processing methods, such as, for example, multi-image composition, contrast enhancement, denoising, resampling, edge extraction, contouring methods, edge-pairing, and contour refinement methods. These image processing methods are automatically chosen based on an AI model that is built using labeled, historical image data, and by auto-detection of contrast levels, thresholds, and feature orientation, automatic image segmentation and classification including hierarchical segmentation, super-pixels segmentation, and using Random-Forests, Convolutional Neural Networks and Restricted Boltzmann Machines for object detection and image classification.

Once extracted features and the ideal features are accurately aligned, all deviations from ideal features are calculated and a set of metrics are computed based on the deviations. These set of metrics are used to identify and quantify the anomalies in every image. Anomalies may then be clustered and classified to accurately solve the problem of accurately detecting what may be a few anomalies in an extremely large collection of input images.

Reference is now made to the drawings; wherein similar or same numbers may be used to designate same or similar parts in different figures. The use of similar or same numbers in different figures does not mean all figures including similar or same numbers constitute a single or same embodiment.

Turning now to FIGS. 1-3, an overview of various aspects of semiconductor device manufacturing is presented. FIG. 1A illustrates the physical design of an exemplary planar transistor. As will be discussed in greater detail below, the physical design of a transistor is used to generate the masks that will be used during manufacturing to print the features on a wafer needed to implement a particular design. The physical design is typically a set of polygons drawn at various layers, such as a gate layer, contact layer, and metal-1 layer.

Transistor 100 is a field-effect-transistor (FET), the transistor type that comprises the bulk of transistors used in modern semiconductor devices. Transistor 100 comprises gate 110, drain 120, and source 130 regions. The gate region in a FET can be thought of as an "on-off" switch that controls the flow of current between drain and source regions. When gate 110 is "off", there is no (or little) current flowing through a channel region that connects drain 120 to source 130 and when gate 110 is "on", current readily flows through the channel region. Transistor 100 is connected to other transistors by a set of interconnect layers stacked vertically on top of transistor 100. Contacts 140 connect drain 120 to segment 150 of a first metal layer (M1), and contacts 160 connect source 130 to M1 segment 170. M1 segments 150 and 170 are in turn connected to a second metal layer (M2) segments 180 and 190 by a first layer of "vias" (V1) 192 and 196, respectively. In general, metal layer thickness increases as one moves up the interconnect stack, with thinner lower-level metals being generally used for the local routing of signals and thicker upper-level metals being used for global signal routing and power/ground planes. For simplicity, FIG. 1A shows only two levels of metal. Current semiconductor manufacturing processing have up to ten layers of metal interconnects.

Figure 1B:
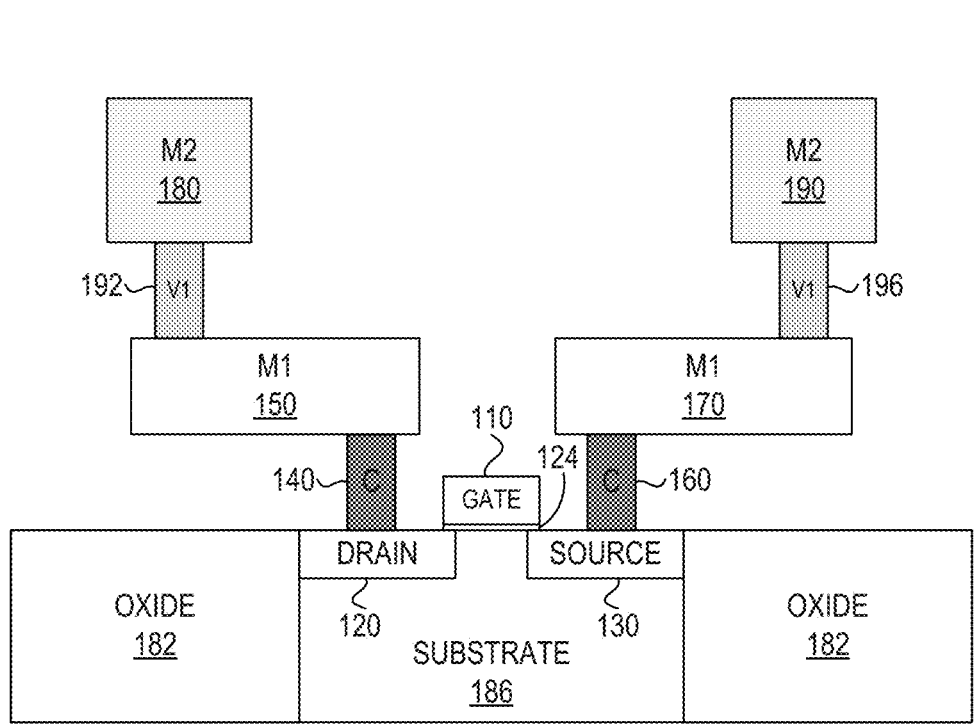
FIG. 1B illustrates an exemplary cross-section of the planar transistor of FIG. 1A taken along the line A-A'.

FIG. 1B illustrates an exemplary cross-section of the planar transistor of FIG. 1A taken along the line A-A'. Cross-section 105 shows gate 110 separated from drain 120 and source 130 regions by high-k dielectric layer 124, which electrically insulates gate 110 from drain 120 and source 130. Transistor 100 is in substrate region 186 and is insulated from adjacent transistors by oxide regions 182. The planar transistor illustrated in FIGS. 1A and 1B is just one type of transistor topography, the planar nature of the transistor reflecting that the gate, source, and drain regions are located on or are adjacent to a relatively planar surface. Another type of transistor topography is the non-planar transistor topography used in FinFETS, which are used extensively in cutting-edge manufacturing processes. FinFETS are field-effect transistors that operate under the same general principle as planar FET transistors—a gate controls the flow of current between drain and source region—with the variation that the gate wraps around a set of fins that extend vertically upwards from the wafer surface.

Essential to semiconductor manufacturing is the process of photolithography, by which patterns are transferred from a mask onto a wafer. As previously mentioned, masks are used to define the shape and location of various features to be patterned on a wafer for a given process layer. For example, one mask defines where oxide regions are located, another mask defines where high-k dielectrics will be located, another mask defines location of source and drain regions, and yet another mask will define where contacts will be placed. Additional masks are used to define each metal layer and intervening via layers.

Figure 2C:
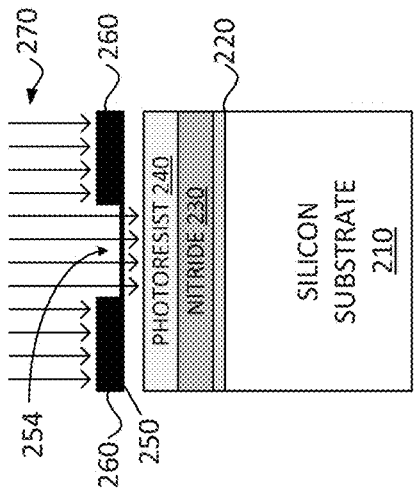
FIGS. 2A-2F illustrate an exemplary photolithography process.
Figure 2F:
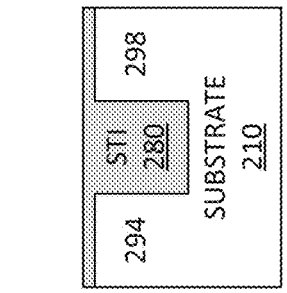
Figure 2B:
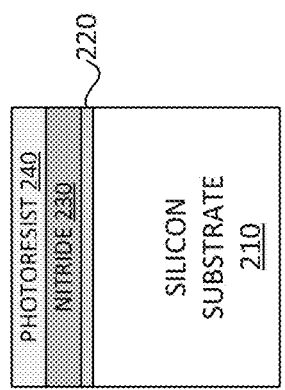
Figure 2E:
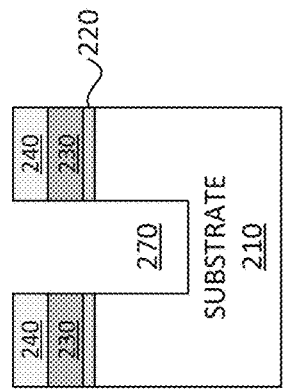
Figure 2A:
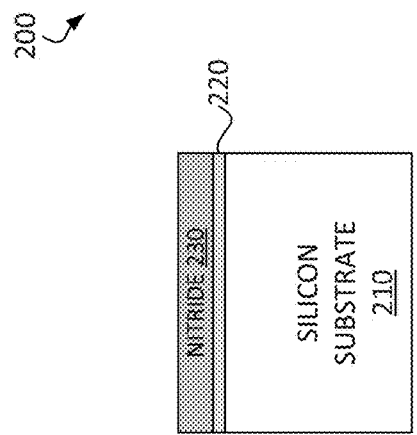
Figure 2D:
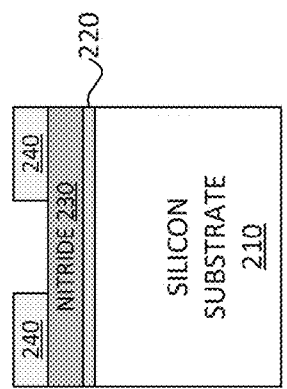

FIGS. 2A-2F illustrate an exemplary photolithography process. Process 200 illustrates how the oxide regions 182 in FIG. 1B can be defined using photolithography. In FIG. 2A, a thin silicon dioxide layer 220 is thermally grown across the top of silicon substrate 210 of a wafer. Silicon nitride layer 230, a protective layer, is deposited on top of silicon dioxide layer 220. In FIG. 2B, photoresist 240 is deposited on top of nitride layer 230. A photoresist is a material whose reactance to an etchant or solvent increases (if a positive photoresist) or decreases (negative photoresist) upon exposure to light. In process 200, photoresist 240 is a positive photoresist. In FIG. 2C, mask 250 with patterns 260 is positioned over the wafer and exposed to light 270. The light 270 passes through transparent region 254 of mask 250 and exposes photoresist 240. Patterned regions 260 are opaque to light 270 and the photoresist regions under patterns 260 are not exposed. In FIG. 2D, photoresist 240 is chemically developed and the exposed regions are dissolved. The remaining portions of photoresist 240 can now act as an on-wafer mask to allow for selective processing of the wafer. In FIG. 2E, the wafer is subjected to an etch step that removes a portion of the silicon nitride layer 230, silicon dioxide layer 220, and substrate 210 to create trench 270. In FIG. 2F, the photoresist and nitride layers are removed, and trench 270 is filled with silicon dioxide to create shallow trench isolation (STI) region 280 that serve to keep transistors formed in regions 294 and 298 electrically isolated from each other.

As masks are the means by which features are realized in semiconductor devices, any semiconductor device design must ultimately be reduced to a physical design, the level of design abstraction from which masks are be generated. The physical design of a transistor (such as FIG. 1A), circuit, or processor to be manufactured is often referred to as a "layout." Electronic design automation (EDA) tools allow processor architects and circuit designers to design at levels of abstraction above the physical design level. They are thus spared from having to spend their days drawing polygons in layout tools to realize their designs. Architects typically define their designs using a hardware design language (HDL), such as VHDL or Verilog. Once they have verified that their designs perform as desired, a physical design can be generated automatically using a library of standard layout cells. Circuit designers often seek performance or functionality not available using standard cells and often enter their designs into a schematic capture tool. Once their custom designs are finalized, the circuit schematics are handed off to layout designers who manually craft the custom physical designs.

Regardless of whether a physical design is generated automatically or manually it must conform to a set layout design rules established for a manufacturing process. Design rules are constraints that a physical design must follow to ensure manufacturability. Most design rules express a minimum width or space for a feature, such as, "gate length?10 nm," "source/drain diffusion enclosure of a contact 16 nm," and "space between metal-1 traces? 20 nm." Design rules represent a trade-off between feature density and manufacturability. Being able to print smaller feature sizes can mean more die can be packed onto a wafer but if the process cannot reliably print the smaller features, the resulting reduction in wafer yield can more than offset cost reduction gained by being able to print more die on a wafer.

Developing design rules for a new process can be difficult as unexpected difficulties can arise. For example, a feature may not scale as much as expected from the previous technology generation due to unforeseen difficulties with a new processing step or a new tool. As process engineers develop a new manufacturing process, they continually fine-tune the individual processing steps to remove as many defect sources as possible. At some point, the process has been tuned enough that the remaining defects that need to be rooted out occur so infrequently that they are difficult to find. Process engineers need to find the occurrence of these rare events during process development so that they can determine whether a tweak to the process can be figured out to reduce the occurrence of the rare event, or to add a design rule to the design rule set so that physical design geometries and patterns correlated to a specific defect are kept out of the final physical design.

Once a physical design is clear of design rule violations and has passed other design validation checks, it is passed to the mask generation phase of an EDA flow. The mask generation phase is far from trivial due to the large discrepancy between the wavelength of the light (?=193 nm) that has been used since the 90 nm technology node and the minimum feature sizes (10 nm) used in the current processes. The minimum feature size that can be printed clearly in a photolithographic process is limited by the wavelength of the light source used and the semiconductor industry has developed resolution enhancement technologies (RET) to allow for the printing of features well below the 193 nm light source wavelength. A first set of RET techniques works to increase resolution and/or depth of focus, and a second set compensates for distortion effect due to printing features with a wavelength larger than minimum feature sizes as well as those inherent in deposition, etching, and other process steps. The first set includes techniques such as phase-shift masks and double-patterning, and the second set includes optical proximity correction (OPC).

Figure 3A:
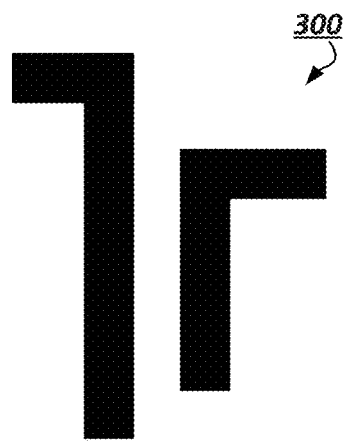
FIGS. 3A-3D illustrate differences between features printed on a mask and those processed on a wafer due to process distortion effects and the use of optical proximity correction to counter those effects.
Figure 3B:
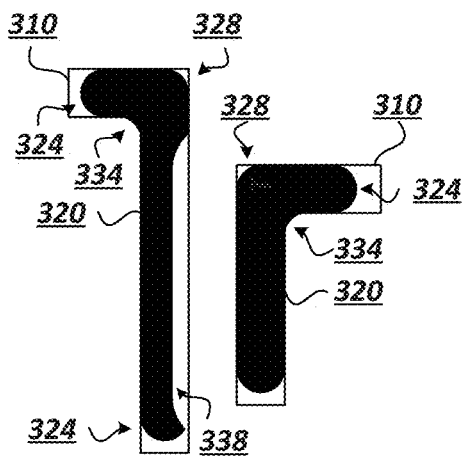
Figure 3C:
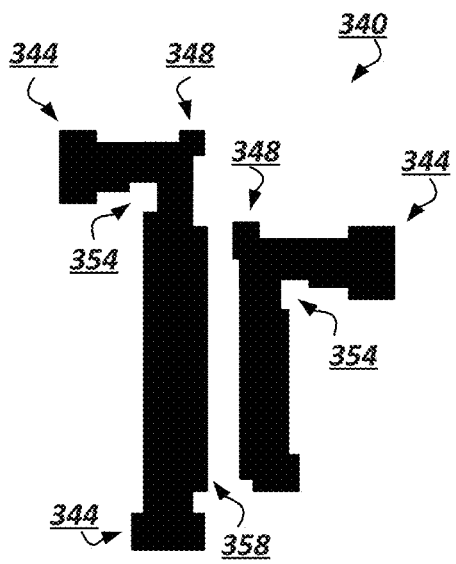
Figure 3D:
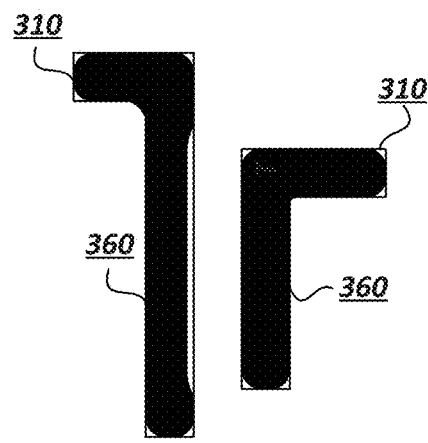

FIGS. 3A-3D illustrate differences between features printed on a mask and those processed on a wafer due to process distortion effects and the use of optical proximity correction to counter those effects. FIG. 3A illustrates two gate polygons 300 in a physical design before being subjected to an OPC process. FIG. 3B illustrates a simplified view of how polygons 300 may appear as processed on a wafer. Outlines 310 represent the boundaries of polygons 300 and shapes 320 represent the corresponding as-processed features. It can be seen that ends 324 and exterior corners 328 of shapes 320 are rounded off, interior corners 334 are filled in, and segment 338 narrowed due to a nearby feature. FIG. 3C illustrates exemplary modified polygons 340 generated by subjecting polygons 300 to an OPC process. Modified polygons 340 are much more complex than original polygons 300. Modified polygons 340 include "dog-bone" features 344 that compensate for end-rounding, "ear" features 348 that compensate for exterior corner-rounding, "mouse-bite" features 354 that compensate for interior corner-rounding, and thickening features 358 that compensate for the presence of nearby features. FIG. 3D illustrates a simplified view of how modified polygons 340 may appear on a wafer after processing. Outlines 310 again represent the boundaries of original polygons 300. As can be seen, modification of polygons 300 by the OPC process results in printed shapes 360 that are closer to the shape and size of original polygons 300. The ends and corners of shapes 360 are less rounded off, the interior corners are less filled in, and the impact of nearby neighbors is diminished.

While OPC generation (and other RET techniques) have allowed minimal features to scale with technology node as the wavelength of the photolithographic light source has remained constant, it does not come without its costs. OPC generation is computationally intensive. OPC recipes can be based on physical models of various processing steps (photolithography, diffusion, etch, deposition, etc.), or be rule-based models that generate OPC features based on individual physical design feature characteristics (width, length, shape, nearest-neighbor characteristics) without relying on the physics of the underlying process steps. The application of model based OPC recipes to a complete physical design may involve the application of physical models to over 10 billion shapes at the gate layer alone and to billions of additional shapes on other layers. Further, the generation of rule-based OPC models, which may save some of the computational complexity of model-based OPC generation, can be a complex affair. Generation of rule-based OPC recipes can be based on trial-and-error due to a lack of full understanding of the complex physics and chemistries at play in the development of cutting-edge processing technologies. This trial-and-error can comprise iteratively manufacturing features with many variations of candidate OPC recipes and seeing which recipes produce the best results.

Figure 4:
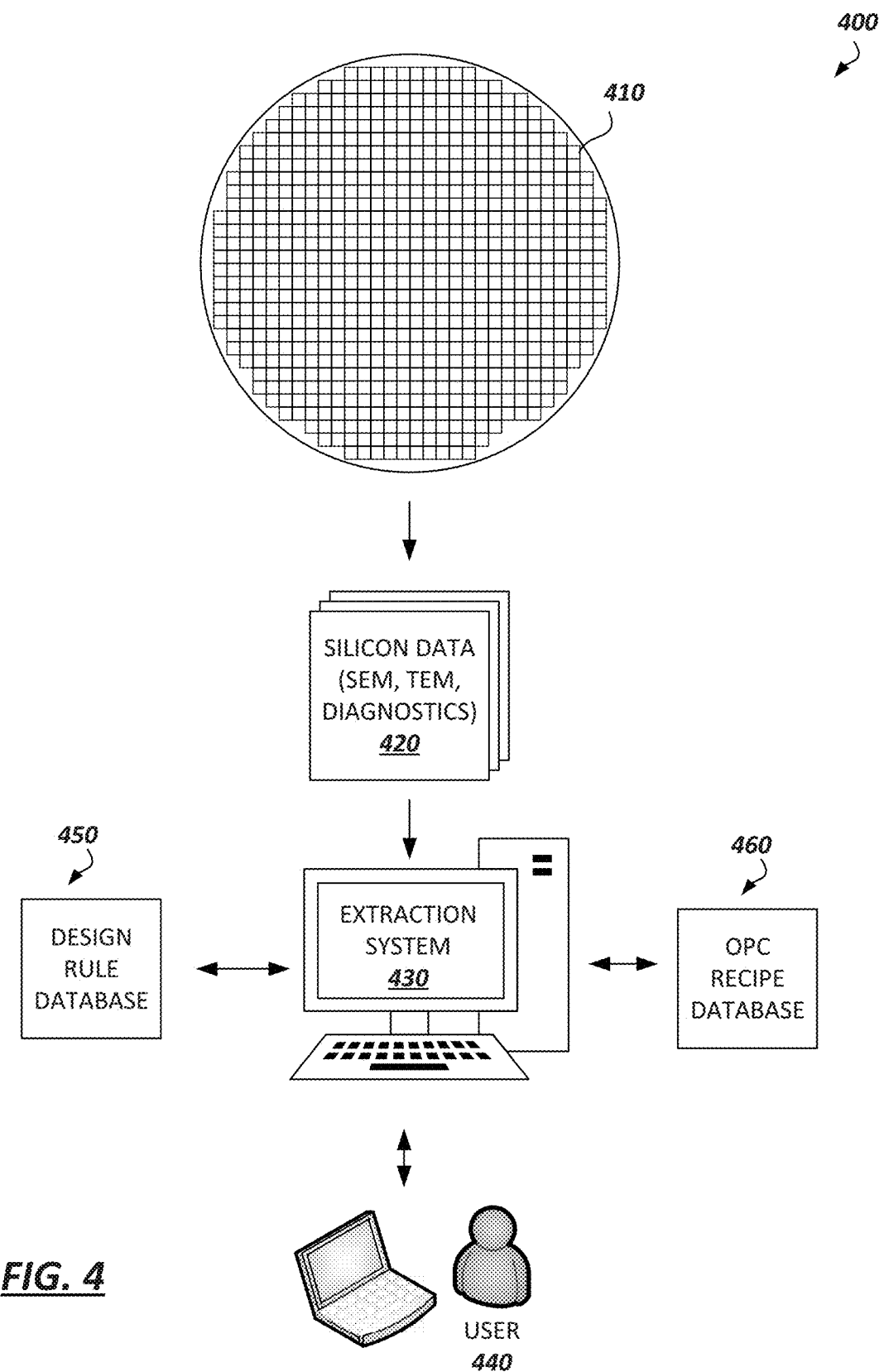
FIG. 4 illustrates an embodiment of how silicon data can be captured in a manufacturing process and provided to a system employing technologies described herein to aid process development and monitor process health.

FIG. 4 illustrates an embodiment of silicon data capture and utilization of silicon data to aid semiconductor manufacturing process development. Silicon wafer 400 comprises dies 410. As discussed earlier, current technology nodes employ 300 mm wafers, which can comprise hundreds of dies. The dies are separated by scribe lines that can contain test structures that can be used to monitor the health of manufacturing process and that are consumed by the dicing process, where a wafer is cut into individual dies 410. During the manufacture of silicon wafer 400, silicon data 420 can be generated that can be used for the development of a new process or to monitor the health of a mature one. Silicon data 420 can be any data collected during the manufacturing of wafer 400, including SEM (scanning electron microscopy) images, TEM (transmission electron microscopy) images, and diagnostic data. Diagnostic data can include data collected from the scribe line test structures, which can measure electrical properties of varies features or layers (e.g., contact or via resistance, metal layer sheet resistance), or indicate the presence of manufacturing defects by testing for shorts between, for example, gate or metal structures that reflect minimum features or layout patterns of concern.

Any number of SEM images can be generated per wafer. SEM images can be taken of one or more areas of interest on an individual die for various die on a wafer. For example, SEM images may be taken of the gate layer in a region where the gate patterns are particularly dense (such as in a memory array) and for representative dies across the wafer to capture cross-wafer manufacturing variations. SEM images can be taken at any point in the manufacturing process. As SEM images can capture a field of view that is hundreds of microns in length and width, individual images can contain many instances of minimum features or areas of interest.

Silicon data 420 can be generated for wafers processed during process development or monitoring and can be generated for wafers processed across fabrication facilities to evaluate cross-facility manufacturing robustness. Given today's large wafer sizes, process complexities, and wafer run rates, the amount of silicon data that can produced during process development or monitoring can be tremendous. The number of SEM images generated during process development alone can reach into the millions.

In some implementations, silicon data 420 can be supplied to a pattern extraction system 430 that digests copious amounts of silicon data and presents to a process engineer or other user 440 information that may useful in developing a new process or improving an existing one. In some examples, the information provided can be semantic patterns (phrases or sentences that are easily understandable by a human) that suggest which physical design patterns or geometries may be responsible for a defect. In other examples, system 430 can determine one or more design rules that may improve process yield and update design rule database 450 for a process or update an OPC recipe database 460 by updating an existing OPC recipe or creating a new one that may improve yield. In some implementations, the system 430 may identify particular sub-patterns or geometries of interest (e.g., which positively or negatively impact yield, etc.). Data generated by the extraction system 430 may be used, in some instances, as the basis for a reference geometry in a search query or during the construction of a chip layout search index, such as described in more detail below, among other example uses.

As discussed above, modern chips may constitute billions of transistors and other circuit elements, based on their respective designs. Techniques have been developed to test chips both during design and manufacturing time, to determine the quality (e.g., yield) of the manufacturing process and/or chip design. Given the enormous number and complexity of structures in the chip, it is often prohibitively expensive to test the entirety of a wafer or even the entirety of a single chip or layer (reticle) of a single chip. Accordingly, in many instances, testing strategies focus on testing sections, or samples, of a chip, and inferring or assuming quality based on tests of these samples. These (and more involved, comprehensive) tests may be performed in order to identify "problem areas" affecting a particular chip design. For instance, certain portions, or sub-areas ("neighborhoods") of a chip layout may be identified as the source of various problems (e.g., affecting yield results, hardware errors, etc.). For instance, specific elements, or groups of elements, may be identified as the potential sources of issues affecting a particular chip design, the elements implementing utilizing semiconducting fabrication techniques, such as discussed above. Accordingly, in some implementations, chip elements, believed to be the source of an issue, may be implemented by defining particular geometries, polygons, shapes, etc. to embody the element through the generation of corresponding masks to etch/deposit the elements according to these corresponding geometric patterns (referred to herein as "reference geometries"). Indeed, a pattern search (e.g., to identify a list of all locations in a large layout that match the given geometric configuration of a particular reference geometry) may play a critical role in many chip design and manufacturing application (e.g., predicting the impact of a yield-limiter pattern by identifying its number of occurrences in the design).

When a particular reference geometry is identified as being of interest, either at design, tape-out, manufacturing, or debug time, it can be particularly difficult to determine whether and to what degree that reference geometry is repeated (and in what contexts) within a particular chip layout. Indeed, given the sheer breadth of a modern chip layout, terabytes of information may be used to represent the chip layout. Conventional approaches of using a brute-force algorithm to match every location in the search space to instances of particular elements (represented by corresponding reference geometry) may utilize significantly large compute resources making real-time search infeasible. While some systems may attempt to improve upon brute force approaches by generating a single hash for each distinct geometric neighborhood to help in finding the exact matches to the neighborhood quickly, such brute force hash-based solutions may also result in large data sizes and similarly fail to provide a viable, real-time solution. Indeed, traditional layout searching techniques are impractical, inefficiently time consuming, and computationally expensive, among other example issues.

Figure 5:
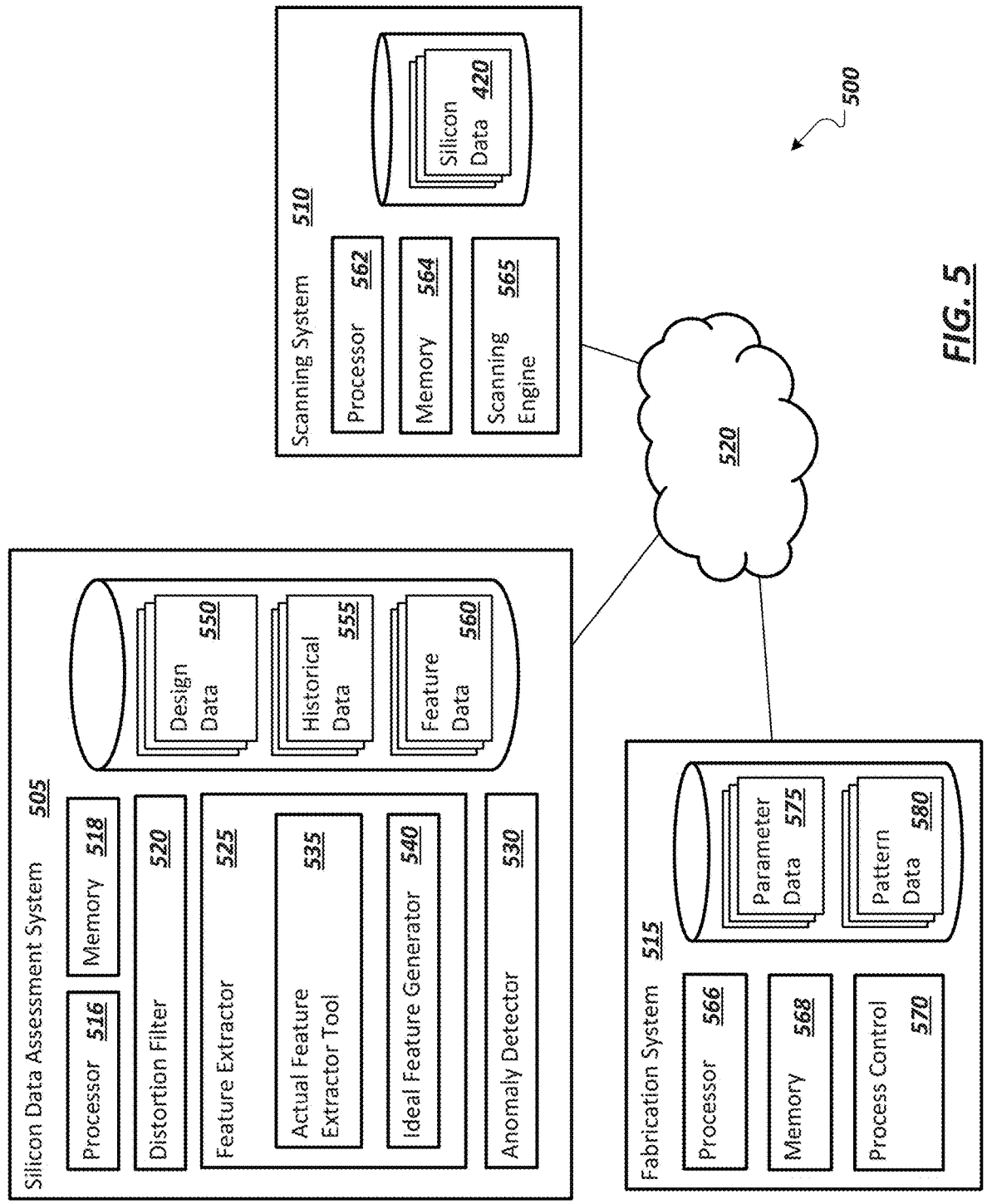
FIG. 5 illustrates a block diagram of an example computing system implementing a silicon data assessment system in accordance with some embodiments.

Turning to FIG. 5, a simplified block diagram 500 is shown illustrating an example system 505, which may enable improved analysis of the quality of the fabrication of a semiconductor chip during any particular stage of the fabrication process. The quality of the fabrication process can be analyzed with reference to how the chip is expected to look like during the particular stage of the fabrication process. For instance, a silicon data assessment system 505 may utilize silicon data (e.g., 420) generated by one or more scanning systems (e.g., 510), such as, for example, images from SEM, in addition to the design data (e.g., 550) related to the structural design of the chip, and historical data (e.g., 555) related to how SEM images of previous chips have looked during that particular stage of fabrication. Metrics and results derived from the silicon data assessment system 505 may be utilized, in some implementations, to tune and control fabrication systems (e.g., 515) that are to perform fabrication steps to manufacture chips based on the new chip design.

In one example, a silicon data assessment system 505 may be implemented using one or more data processing devices (e.g., 516), one or more machine-readable memory elements (e.g., 518), among other components implemented in hardware and/or software to realize computer-implemented logic of the silicon data assessment system 505. For instance, a distortion filter 520 may be implemented to remove distortion of SEM images of one or more chips obtained from a scanning system (e.g., 510). As an example, the distortion filter 520 can use one or more algorithms to remove distortion of the SEM images. In some embodiments, the distortion feature can use data obtained from a feature extractor (e.g., 525), which can include for example, feature data (e.g., 560).

As an example, the feature extractor 525 may be implemented to produce feature data (e.g., 560). For instance, feature extractor 525 can be implemented to determine features of the silicon chip that is being fabricated. Furthermore, feature extractor 525 may be implemented during any stage of the fabrication to determine features of the silicon chip that is being fabricated. In some instances, feature extractor 525 may be implemented to determine the ideal features of the chip and the actual features present on the chip.

The actual feature extractor tool 535 may be implemented to determine the actual features of the chip being fabricated as indicated in the silicon data (e.g., 420), which can be seen in the SEM images provided by the scanning system (e.g. 510). In some instances, algorithms of the actual feature tool 535 are able to compare and contrast the shades and/or colors of the images of the chip to determine whether a feature is present.

The ideal feature generator 540 may be implemented to determine what ideal features should be seen in the SEM images of the chip being fabricated. As examples, design data (e.g., 550), which comprises data related to the design of the chip, including features that should be present at the particular stage of fabrication of the chip, and historical data (e.g., 555), which comprises data related to historical SEM images of previous chips during the same stage of fabrication, can be used by feature extractor 525 to produce feature data (e.g., 560).

In some instances, feature data 560 can be used by the distortion filter and/or the anomaly detector. As an example, the distortion filter 520 can use a comparison of the location of actual features present in the SEM images to the location of the corresponding ideal feature to determine what type of distortion exists in an image, and, therefore, the distortion filter can be implemented to reduce or remove the distortion present in the images. After distortion is removed, feature extractor 525 can once again determine the location of any features present in the image. This data can then be used to determine whether distortion remains (e.g., be comparing the location of actual features of the image to the ideal features.)

As another example, the anomaly detector also uses feature data 560 to determine whether any anomalies exist in the chip being fabricated. For instance, after all distortions that can be removed from an image have been removed, the anomaly detector 530 can compare the actual features of the image to the corresponding ideal features of that image. The anomaly detector 530 can be implemented to produce metrics, alarms, and the like that can be used by other systems (e.g., fabrication system 515) or process engineers evaluating the efficacy of the fabrication process.

As further shown in the example of FIG. 5, a silicon data assessment system 505, in some embodiments, may interface with other systems, such as scanning systems (e.g., 510) and fabrication systems (e.g., 515). In some implementations, one or more of such systems may be implemented on distinct physical computing systems, which may be interconnected by one or more wired or wireless networks (e.g., 520). In one example, a scanning system 510 may be implemented using one or more data processing devices (e.g., 516), one or more machine-readable memory elements (e.g., 518), among other components implemented in hardware and/or software to realize computer-implemented logic of the testing system 510. A variety of different scanning systems may be provided to scan images of a chip as it undergoes various processing steps performed by various fabrication tools. A scanning system 510 may therefore include a scanning engine 565 adapted to the scanning of a wafer and/or chip(s) at or following a corresponding process step, which may be implemented using corresponding machine-executable code stored in memory (e.g., 564) and executed by one or more data processors (e.g., 562). Corresponding silicon data 420 may be generated from the scanning. In some instances, an expansive collection of silicon data 420 may be generated for a single chip or wafer (e.g., millions of images, containing petabytes of data, may be generated for a single wafer and all of the chips present on that wafer.)

Results returned by the silicon data assessment system 505 representing any anomalies present on a chip or chips, or metrics related to the fabrication of a particular chip or chips, may be generated, and in some cases, compiled to be used as inputs to other systems involved in the design, masking, and eventual manufacture of the chip design. For instance, an example fabrication system (e.g., 515) may include process control subsystems and tools (e.g., 570), which may be implemented using corresponding machine-executable code stored in memory (e.g., 568) and executed by one or more data processors (e.g., 566). A fabrication system 515 may utilize pattern data 580 defining a particular chip layout to control the performance of various lithography process steps. Pattern data 580 may represent corrected, modified, or optimized versions of an original chip layout, which was modified based on results derived by a silicon data assessment system (e.g., 505). Likewise, parameter data 575 may be utilized by a process control tool 570 to dictate the manner in which a particular process step should be carried out. Parameter data 575 may also be based on or derived from results derived by a silicon data assessment system (e.g., 505), such as introduced herein. For instance, a silicon data assessment may alert the fabrication system of a presence of anomalies. As such, the fabrication system may alter fabrication to correct or remove the chip from production if necessary.

In some implementations, the systems discussed herein (e.g., 505, 510, 515) may be implemented as a computer device, such as a personal computing device, mobile computing device, server computing system (e.g., a rack scale, blade server, or other server computer), a computing system implemented on a tool or other manufacturing machine, among other examples. The system 505 may run an operating system such as Windows, Linux, iOS, Symbian OS, Unix, Android, among other examples. Through such an operating system (or virtual machines or software containers implemented on the system), the system may have the capability to run applications locally and/or communicate with applications that are provided by remote servers in a communications network. Such systems may be implemented in a variety of form factors and embodiments.

Example systems, as illustrated in FIG. 5, may further include one or multiple computer-accessible memory elements. For instance, memory elements may be implemented as non-transitory computer readable media, such as flash memory, a magnetic disk drive, an optical drive, a programmable read-only memory (PROM), a read-only memory (ROM), or any other physical memory device or combination of such memory elements. Logic implemented in software can run on a processor capable of executing computer instructions or computer code. The processor might also be implemented in hardware using an application specific integrated circuit (ASIC), programmable logic array (PLA), field programmable gate array (FPGA), or any other integrated circuit. In some embodiments, a system may include or be implemented as a system on chip (SOC). In other embodiments, one or more blocks in a parallel processing device can be implemented as a separate chip, and the parallel processing device can be packaged in a system in package (SIP). In some embodiments, at least some logic and functionality of a machine (e.g., silicon data assessment system 505) may be implemented using one or more hardware accelerator device implementing specialized functionality for use in performing various operations used by the system (e.g., by feature extractor 525), among other example implementations.

Figure 6:
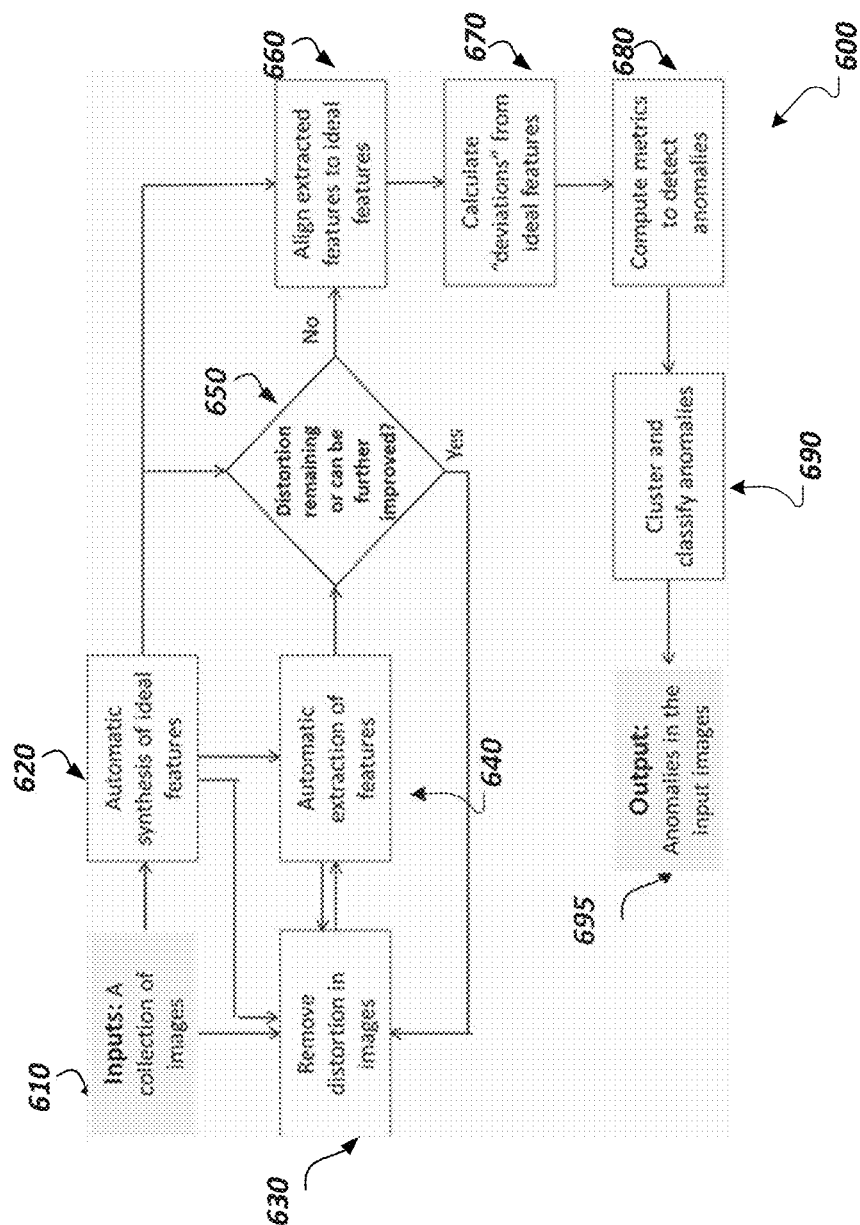
FIG. 6 is a block diagram illustrating an example of a method for identifying anomalies in images in accordance with some embodiments

Turning to the simplified block diagram 600 of FIG. 6, an example flow is shown for a method for identifying anomalies in images. As illustrated, a collection of images is collected 610 and are analyzed for anomalies. As an example, the images collected can be images of wafer during semiconductor processing. More particularly, each image can represent a portion of a wafer during semiconductor processing. The method of diagram 600 can comprise a procedure 620 of the automatic synthesis of ideal feature of an image, a procedure 630 of removing distortion in the images, and a procedure 640 of the automatic extraction of features in the images. If there is no more distortion remaining in an image, a procedure 660 can be used to align the extracted features in an image to the ideal features in that image. The method of FIG. 6 can further comprise a procedure 670 of calculating the deviation from the ideal features, a procedure 680 of computing metrics to detect any potential anomalies, and a procedure 690 of clustering and classifying any anomalies. Finally, the method of FIG. 6 can comprise the output (695) of any anomalies present in any of the images, which would indicate an anomaly may present on the wafer.

As illustrated in FIG. 6, a collection of images is collected for analyzation. In some examples, the images can represent images take of a wafer during semiconductor processing. For example, millions of images, containing petabytes of data, of a single wafer (e.g., wafer 410) can be taken. Each image can represent a different part of the wafer. These images represent silicon data (420) that can be used to analyze the effectiveness of a semiconductor process, such as, for example, helping to determine whether any anomalies exist on the wafer.

With further reference to the flow diagram of FIG. 6, the method of flow diagram 600 comprises procedures 620 of automatic synthesis of ideal features, 630 of removing distortion from the images, and 640 automatic extraction of features present in each image. The method of FIG. 6 can be completed using a system with machine learning capabilities, such as, for example, the example system shown in FIG. 5 above. As demonstrated in FIG. 6, procedures 620, 630, and 640 can be run simultaneously for each image collected.

Figure 7:
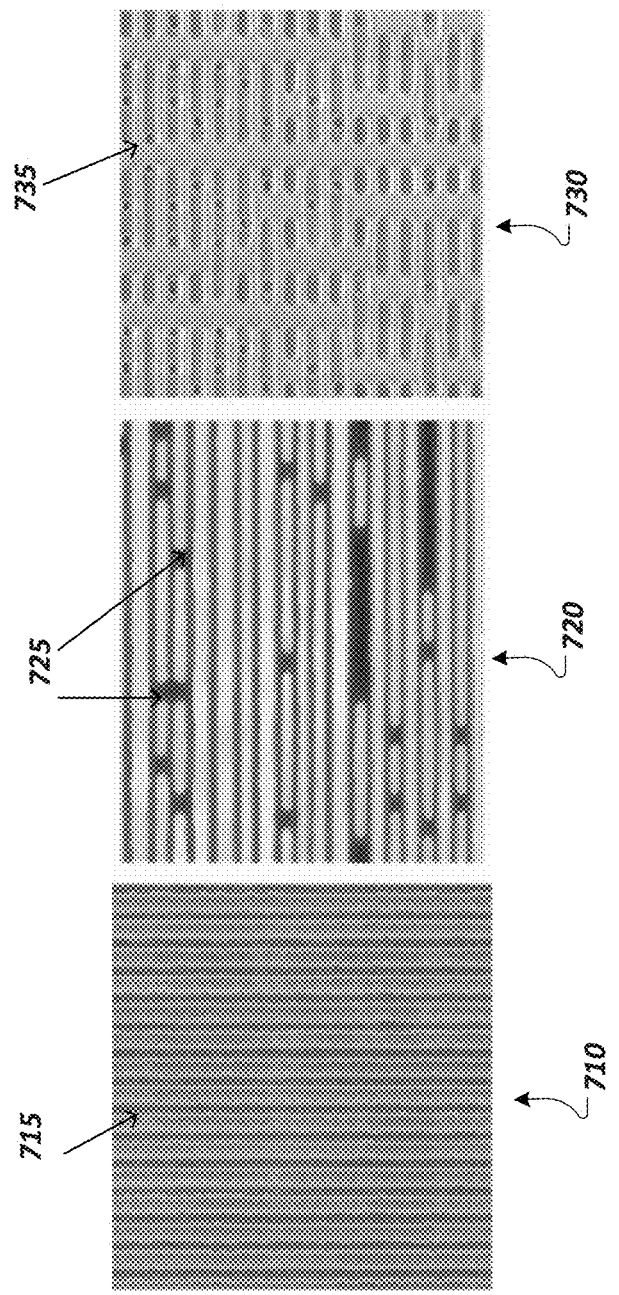
FIG. 7 illustrates different examples of images of portions of semiconductor chips with different features in accordance with some embodiments.

Procedure 640 comprises the automatic extraction of features for each image. The procedure of 640 will determine whether any features are present in an image. The features can be differences in color on the image. Such differences in color (such as, for example, a light gray area compared to a dark gray area) indicate that a feature is present in the image. Furthermore, the geometry of the feature can help determine what the feature is. For example, FIG. 7 illustrates different examples of images of portions of semiconductor chips with different features. The image represented in 710 shows an image of an area of a wafer that comprises trenches 715. As another example, the image represented in 720 illustrates an area of a wafer that comprises areas 725 that are filled in with a material. Finally, the example of 730 illustrates an area on the wafer that comprises contact holes 735 inside of metal. The features illustrated in FIG. 7 are merely exemplary. It should be noted that more or less features may be present in any image analyzed via the method of FIG. 6.

In addition to the extraction of features present on each image, the method of FIG. 6 also automatically synthesizes the ideal features that should be present in each image. As such, for each image of a wafer, ideal features should be present within those images. There are a variety of ways in which the ideal features can be determined. For example, the ideal features can be determined by the design of the wafer itself. That is, the features that are designed to be present on the wafer should be present on the wafer. It should be noted that the image analysis method of FIG. 6 can be carried out multiple times for each location on the wafer. For example, semiconductor processing is accomplished during many different steps and, as such, there are many different layers for each location on the wafer. Therefore, the ideal features for each image will depend on what layer of processing is currently in process.

In addition to the design features of the wafer, historical data can also be used to determine the ideal features that should be present on an image. There can be a historical collection of images of wafers that were ideal. These historical images can be used to determine the ideal features for the images. In other examples, a combination of historical data and design data can be used to synthesize the ideal features that should be present in each image.

Figure 8:
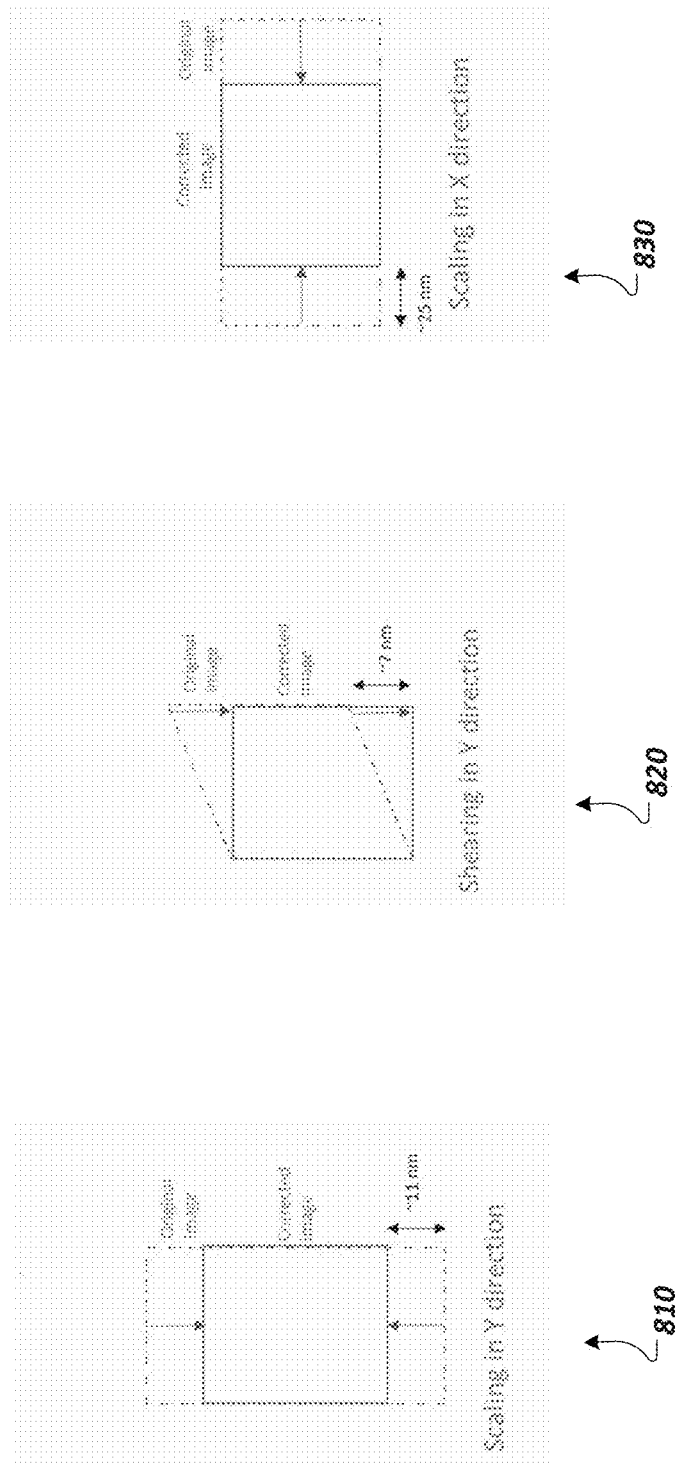
FIG. 8 illustrates examples of different types of distortion that may be present on images in accordance with some embodiments.

When the images are received from a source, such as, for example, a scanning electron microscope, there may be distortion in the images. Furthermore, different microscopes can have different types of distortion. FIG. 8 illustrates examples of different types of distortion that may be present on the images. The examples of FIG. 8 are merely exemplary, and many other types of distortion may exist. The example of 810 shows distortion in which there is scaling in the y direction. In the example of 810, the original image has been "stretched" in the y direction, and therefore must be resized correctly. In such an example, there is little to no distortion in the center of the image, but the distortion increases as you move away from the center of the image vertically, or in they direction. In the example of 810, the image has been stretched approximately 11 nm at each end vertically.

Similarly, the example of 830 has scaling in the x direction, or horizontally. In the example of 830, the original image has been "stretched" in the x direction, and therefore must be resized correctly. In such an example, there is little to no distortion in the center of the image, but the distortion increases as you move away from the center of the image horizontally, or in the x direction. In the example of 830, the image has been stretched approximately 25 nm at each end horizontally.

The example of 820 has shearing. This example has shearing in the y direction, but there may be shearing in another direction too. As shown in the example of 820, the image has shifted in the y direction, or vertically, on one side of the image. The shifting in this one example is approximately 7 nm. As such, there is very little to no distortion on the left side of the image, but it increases as you mover horizontally towards the side of the image with the shearing.

Although FIG. 8 comprises three separate examples of distortion, there can be other types of distortion present in the images. As such, the method of FIG. 6, with the system outlined in FIG. 5 is capable of accounting for any type of distortion, as discussed below with respect to FIG. 9.

As is illustrated in FIG. 6, with the use of the systems shown in FIG. 5, procedures 620, 630, and 640 can be processed automatically and simultaneously. The examples of FIG. 9 and FIG. 10 illustrate an example of the application of procedures 620, 630, and 640.

Figure 9:
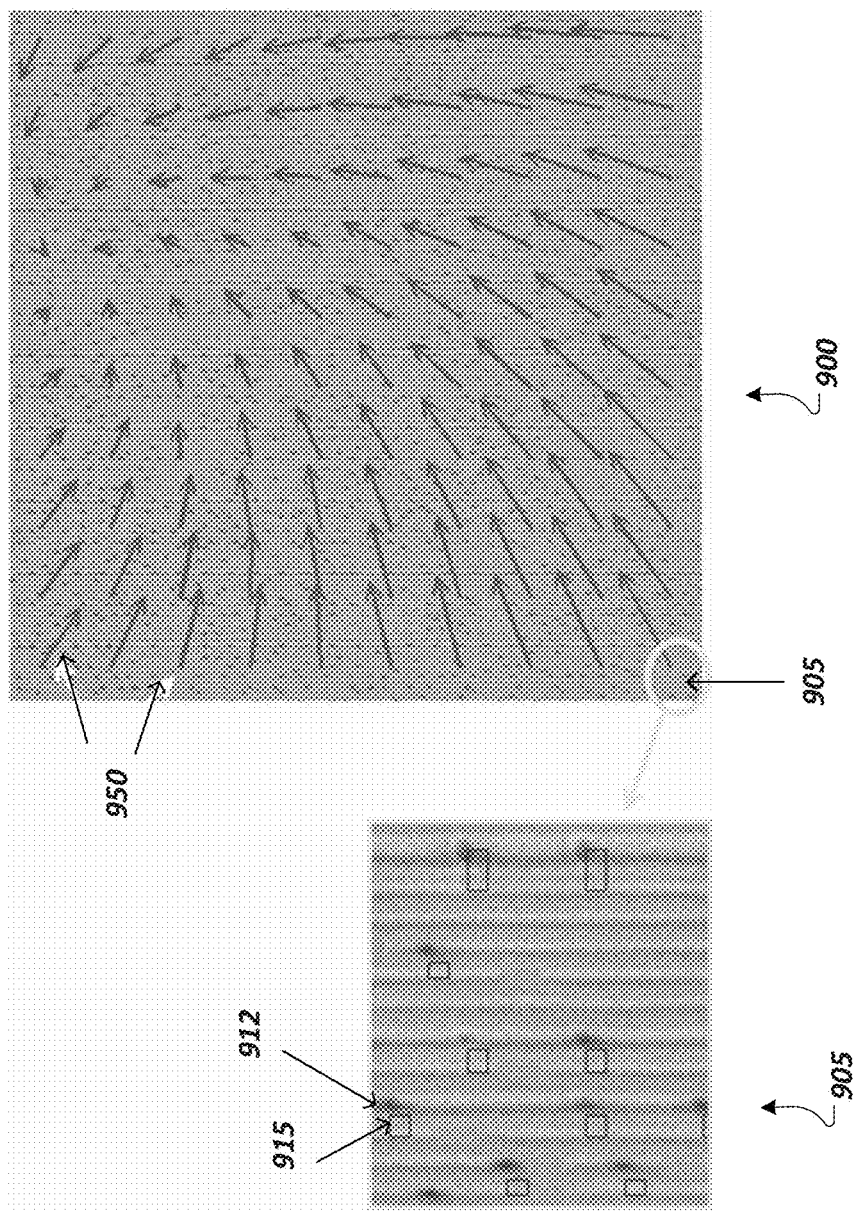
FIG. 9 illustrates an exemplary application of processes associated with a method for identifying anomalies in accordance with some embodiments.
Figure 10:
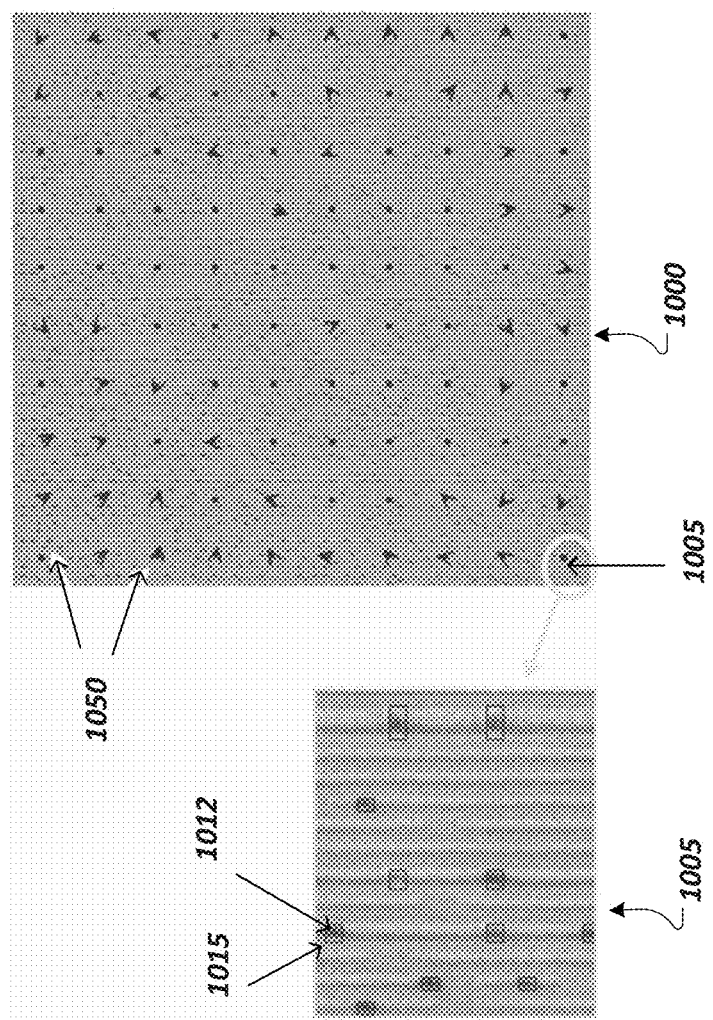
FIG. 10 illustrates an exemplary application of processes associated with a method for identifying anomalies in accordance with some embodiments.

FIGS. 9 and 10 illustrate an exemplary application of processes 620, 630, and 640 of the method of FIG. 6. In the example of FIG. 9, an image 900 comprising at least a portion of a wafer is illustrated. A portion 905 of image 900 is highlighted and enlarged to see greater detail. As shown in FIG. 9, the lower left corner of image 900 is portion 905.

As is illustrated in the zoomed in portion 905, ideal features 915 have been synthesized, and actual features 912 have been extracted. As can be seen in portion 905, the ideal features 915 and actual features 912 do not overlap. Thus, there may be distortion in image 900 that can cause an instance where there is no overlap of the ideal features 915 with the actual features 912.

For each comparison of ideal feature vs. actual feature of image 900, a vector can be created to help analyze the image. For example, vectors 950 can be created to help determine whether there is distortion in image 900. As one example, vectors 950 can be created to illustrate the difference between the centroid of the extracted features 912 as compared to the centroid of ideal features 915. Each vector 950 of image 900 can represent the direction (the way the vector arrow points) and size (the length of the vector arrow) of the distortion present. The vectors 950 of image 900 illustrate that there is a pattern to the distortion if image 900. Somewhere near the upper right quadrant of image 900, vectors 950 are smaller in magnitude than at other locations of image 900. The further you move away from this quadrant, the larger vectors 950 become. In addition, the direction of the arrows of vectors 950 also seem to indicate that there is a pattern of distortion. For example, the arrows of vectors 950 don't seem to point in random directions. As such, distortion can be removed using, for example, a machine learning system similar to that illustrated in FIG. 5.

FIG. 10 illustrates an example image 1000. Image 1000 can be considered the same as image 900 after any distortion has been removed. Similar to FIG. 9, FIG. 10 comprises a portion 1005 that is zoomed in to see greater detail. Once again, portion 1005 illustrates in greater detail ideal features 1015 and actual features 1012. In the example of FIG. 10, since distortion has been removed, portion 1005 illustrates and example in which ideal features 1015 and actual features 1012 align with one another.

Once again, similar to the example of FIG. 9, vectors 1050 of FIG. 10 illustrate a comparison of the actual features in the image to the ideal features. One or more algorithms are applied to image 900 of FIG. 9 to remove distortion, which results in image 1000 of FIG. 10. The removal of the distortion can be seen in the comparison of vectors 950 of FIG. 9 vs. vectors 1050 of FIG. 10. As opposed to the clear pattern of vectors 950, vectors 1050 appear to be much smaller in magnitude and have no real pattern in arrow direction. As such, there does not seem to be any mathematical relationship between vectors 1050, which may indicate that all possible distortion that can be removed has been removed. It should be noted that, although vectors are shown with respect to an image in the examples of FIGS. 9 and 10, there does not need to be vectors shown on an image to encompass the embodiments of the present invention.

After some distortion is removed from an image, a determination is made as to whether more distortion can be removed. As an example, if there is a pattern of widespread differences between ideal features and actual features, then more distortion may exist. As such, and as represented by decision 650 of FIG. 6, if there is distortion remaining that can be improved, the process (630) to remove distortion is repeated. If there is no more distortion that can be removed, the exemplary method illustrated in FIG. 6 continues to procedures 660, 670, 680, 690, and 695, which completes the analysis of one or more images.

With reference to FIG. 6, the method of flow 600 continues a procedure 660 of aligning extracted features to ideal features. Once again, the example shown in FIG. 10 visually illustrates an alignment of extracted features to ideal features. Procedure 660 can also be considered a procedure of placing an ideal image of ideal features over the image (with corrected distortion) with actual features. This allows an analysis to be conducted to determine where any anomalies exist.

Next, the method of FIG. 6 can continue with a procedure 670 of calculating deviations between the ideal features and actual features. Once again, this can be visually represented by FIG. 10, wherein vectors 1050 can represent deviations between actual and ideal features. As described herein, vectors 1050 as shown in FIG. 10 represented the different in location between an ideal feature and an actual feature. However, there are other types of variations that can exist. For example, types of deviations that may be important can include, but are not limited to, area of the feature, horizontal dimension of the feature, vertical dimension of the feature, the opening distance between to separate features (vertical and/or horizontal), difference in the shape of features, and broken contours.

Procedure 680 of the method of FIG. 6 comprises computing metrics as it relates to the comparison of the ideal features to the actual features. The metrics of this procedure can include any metric that is useful to the analysis of the images (and therefore the semiconductor being processed in this example.) As examples, the metrics can include, but are not limited to, any characterization of the deviations listed above.

The method of flow 600 can further comprises a procedure 690 of clustering and classifying any anomalies present. As an example, all anomalies that correspond to a similar deviation can be clustered (or grouped together) and classified together. This allows for an easier analysis of the processing of the semiconductor. An exemplary list of clustering and classifications can include, but is not limited to, the number of broken contours, number of metal pinches, number of plugs with an area greater than a specific value, the number of cut plugs with an area less than a specific value, the number of cut plugs corresponding to a certain height, the number of particles, the number of merged metal contours, the number of missing metal contours, the number of plug merged contours, and the number of plug area violations.

Finally, the output of the anomalies in the images is given during procedure 695. In addition to listing any clusters and classifications shown above, this can also include any information about the anomalies in the images. For examples, rules can be created to indicate any problems shown by the images. As examples, the following rules can indicate that the anomalies show that there is a failure in the semiconductor processing: failure of the features of the image to align with the ideal features, images with small cut plugs, images with a broken or pinched line and no small plugs and no particles, images with more than one broken or pinched metal, images with small plugs or small cut plugs, images with merged metal lines, and similar classifications.

Figure 11:
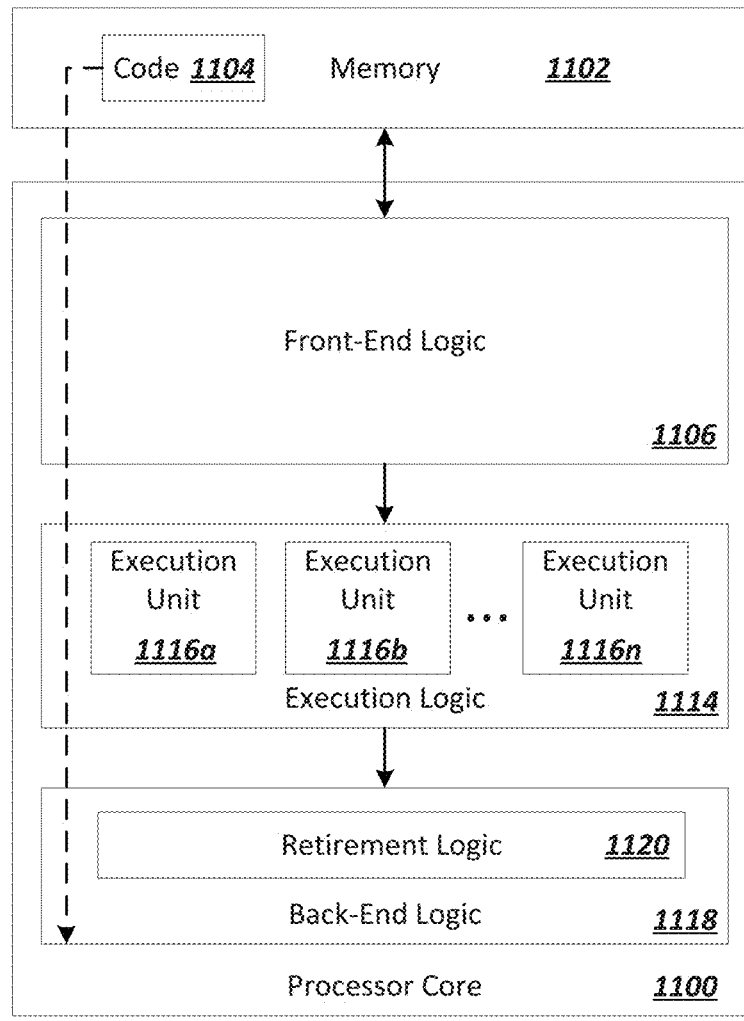
FIG. 11 is a block diagram of an exemplary processor in accordance with one embodiment.
Figure 12:
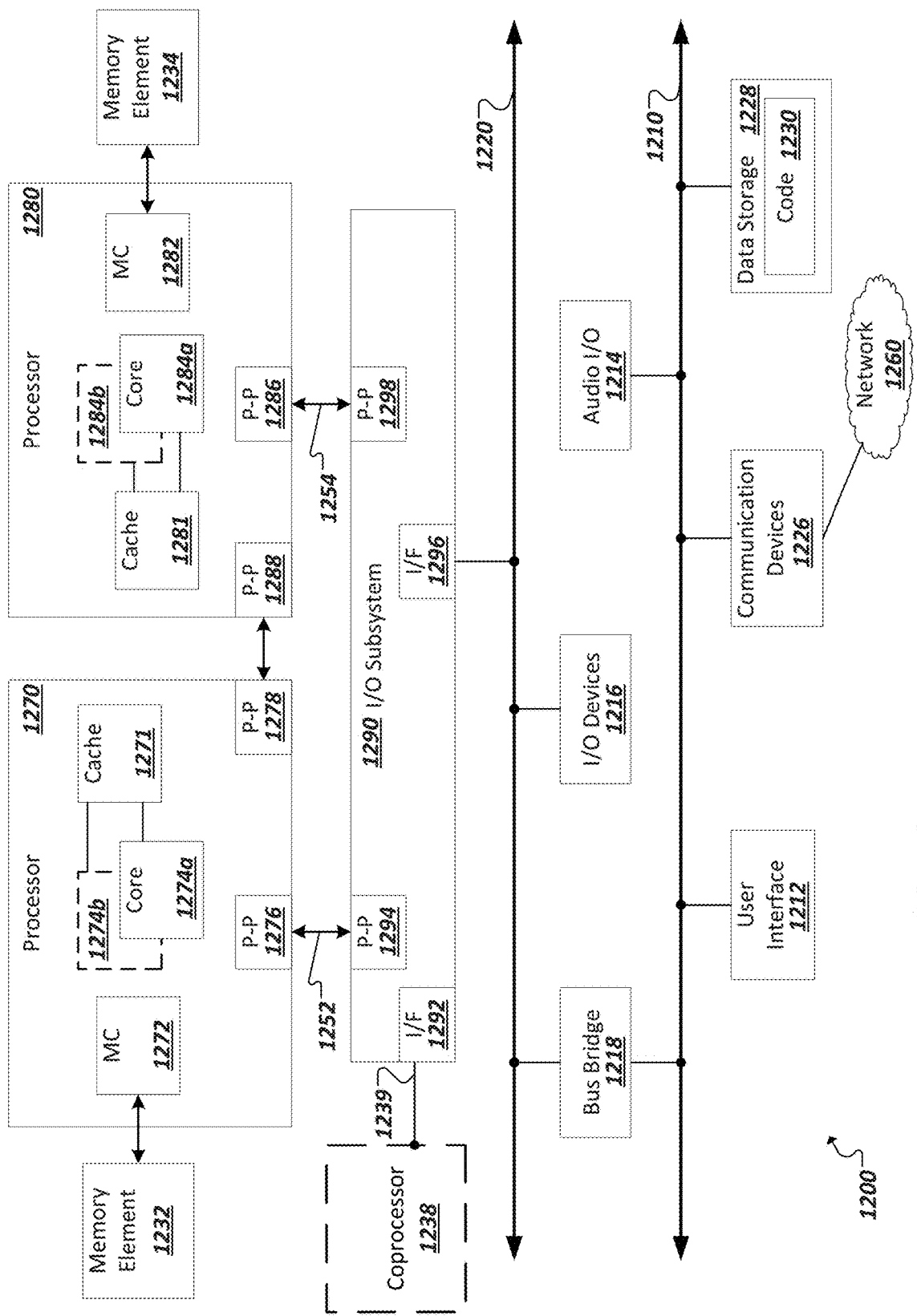
FIG. 12 is a block diagram of an exemplary computing system in accordance with one embodiment.

FIGS. 11-12 are block diagrams of exemplary computer architectures that may be used in accordance with embodiments disclosed herein. For instance, the computer architectures shown in these examples may be utilized to implement or execute an improved compiler and/or a portion of a target computing device. In other examples, the computer architectures shown in these examples may consume results generated by the neural network, provide data for use as inputs to the neural networks, among other cooperative uses. It should be appreciated that other computer architecture designs known in the art for processors and computing systems may also be used. Generally, suitable computer architectures for embodiments disclosed herein can include, but are not limited to, configurations illustrated in FIGS. 11-12.

FIG. 11 is an example illustration of a processor according to an embodiment. Processor 1100 is an example of a type of hardware device that can be used in connection with the implementations above. Processor 1100 may be any type of processor, such as a microprocessor, an embedded processor, a digital signal processor (DSP), a network processor, a multi-core processor, a single core processor, or other device to execute code. Although only one processor 1100 is illustrated in FIG. 11, a processing element may alternatively include more than one of processor 1100 illustrated in FIG. 11. Processor 1100 may be a single-threaded core or, for at least one embodiment, the processor 1100 may be multi-threaded in that it may include more than one hardware thread context (or "logical processor") per core.

FIG. 11 also illustrates a memory 1102 coupled to processor 1100 in accordance with an embodiment. Memory 1102 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1100 can execute any type of instructions associated with algorithms, processes, or operations detailed herein. Generally, processor 1100 can transform an element or an article (e.g., data) from one state or thing to another state or thing.

Code 1104, which may be one or more instructions to be executed by processor 1100, may be stored in memory 1102, or may be stored in software, hardware, firmware, or any suitable combination thereof, or in any other internal or external component, device, element, or object where appropriate and based on particular needs. In one example, processor 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor 1100 can also include execution logic 1114 having a set of execution units 1116a, 1116b, 1116n, etc. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor 1100 allows out of order execution but requires in order retirement of instructions. Retirement logic 1120 may take a variety of known forms (e.g., re-order buffers or the like). In this manner, processor 1100 is transformed during execution of code 1104, at least in terms of the output generated by the decoder, hardware registers and tables utilized by register renaming logic 1110, and any registers (not shown) modified by execution logic 1114.

Although not shown in FIG. 11, a processing element may include other elements on a chip with processor 1100. For example, a processing element may include memory control logic along with processor 1100. The processing element may include I/O control logic and/or may include I/O control logic integrated with memory control logic. The processing element may also include one or more caches. In some embodiments, non-volatile memory (such as flash memory or fuses) may also be included on the chip with processor 1100.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces.

Processors 1270 and 1280 may also each include integrated memory controller logic (MC) 1272 and 1282 to communicate with memory elements 1232 and 1234. Example processors (e.g., 1270, 1280) may include one or more processor cores (e.g., 1274a-b, 1284a-b), which may be coupled to respective cache memory (e.g., 1271, 1281). In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with a chipset 1290 via individual point-to-point interfaces 1252 and 1254 using point-to-point interface circuits 1276, 1286, 1294, and 1298. Chipset 1290 may also exchange data with a co-processor 1238, such as a high-performance graphics circuit, machine learning accelerator, or other co-processor 1238, via an interface 1239, which could be a PtP interface circuit, such as, for example, point-to-point interface circuit 1292. In alternative embodiments, any or all of the PtP links illustrated in FIG. 12 could be implemented as a multi-drop bus rather than a PtP link.

Chipset 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a user interface 1212 (such as a keyboard, mouse, touchscreen, or other input devices), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Although the following examples illustrate embodiments related to the fabrication of semiconductor chips, the following examples can be applied to similar embodiments in which images, particularly a large number of images, are analyzed to determine whether any anomalies exist. As examples, x-ray images can be analyzed to determine whether anomalies may exist, or a collection of images from a manufacturing process can be analyzed to determine whether anomalies exist during the manufacturing process. Furthermore, embodiments herein can encompass examples not specifically mentioned herein.

Example 1 is a machine-readable storage medium with instructions stored thereon, wherein the instructions are executable by a machine to cause the machine to receive an input, where the input comprises one or more images representing a status in a fabrication of a semiconductor chip, where the status corresponds to a stage in the fabrication; remove distortion from the one or more images; extract actual features of the semiconductor chip as observed from the one more images; determine synthesized ideal features of the semiconductor chip associated with completion of the stage in the fabrication from the one or more images; and compare the actual features to the ideal features to determine whether anomalies associated with the stage exist in the semiconductor chip.

Example 2 may include the subject matter of example 1, where the determination of the ideal features comprises using historical data to determine the ideal features from the one or more images.

Example 3 may include the subject matter of any of examples 1-2, the determination of the ideal features comprises using a design layout for the semiconductor chip to determine the ideal features from the one or more images.

Example 4 may include the subject matter of any one of examples 1-3, where wherein the extraction of actual features comprises detecting contours visible on the one or more images.

Example 5 may include the subject matter of example 4, where the contours are detected based on differing colors in the one or more images.

Example 6 may include the subject matter of any one of examples 1-5, where the instructions are further executable to cause the machine to compare a first location of each actual feature on the one or more images with a second location of each of the ideal features on the one or more images.

Example 7 may include the subject matter of any one of examples 1-6, where the instructions are further executable to cause the machine to determine the type of distortion on one or more images by analyzing a pattern corresponding to the differences between the first location with the second location.

Example 8 may include the subject matter of any one of examples 1-7, where the instructions are further executable to cause the machine to determine whether any distortion remains in the one or more images and align the extracted features to the ideal features.

Example 9 may include the subject matter of example 8, where the instructions are further executable to cause the machine to calculate deviations between the aligned extracted features and ideal features, wherein the deviations comprise at least one difference between the extracted feature and the corresponding ideal feature.

Example 10 may include the subject matter of any one of examples 1-9, where the fabrication comprises a plurality of processing steps and the stage corresponds to completion of a one of the plurality of processing steps.

Example 11 may include the subject matter of example 10, where the semiconductor chip is to be fabricated based on a chip layout design, fabrication of the semiconductor chip remains incomplete following completion of the processing step, the synthesized ideal features of the semiconductor chip represent a predicted appearance of at least a portion of the semiconductor chip following completion of the processing step, and the predicted appearance differs from a finished appearance defined in the chip layout design.

Example 12 may include the subject matter of any one of examples 1-11, where the instructions are further executable to cause the machine to classify the anomalies in one of a plurality of classifications.

Example 13 may include the subject matter of example 12, where the anomalies are classified according to an unsupervised clustering algorithm.

Example 14 may include the subject matter of any one of examples 1-13, where the one or more images are obtained using scanning electron microscopy.

Example 15 is a method comprising: receiving an input, wherein the input comprises one or more images representing a status in the fabrication of a semiconductor chip, wherein the status corresponds to a stage in the fabrication; removing distortion from the one or more images; extracting actual features of the semiconductor chip as observed from the one more images; determining synthesized ideal features of the semiconductor chip associated with the completion of the stage in the fabrication from the one or more images; and comparing the actual features to the ideal features to determine whether anomalies associated with the stage exist in the semiconductor chip.

Example 16 may include the subject matter of example 15, where the one or more images are obtained using scanning electron microscopy.

Example 17 may include the subject matter of any one of examples 15-16, further comprising determining whether any distortion remains in the one or more images, and aligning the extracted features to the ideal features.

Example 18 may include the subject matter of example 17 further comprising classifying the anomalies in one of a plurality of classifications; where the anomalies are classified according to an unsupervised cluster algorithm.

Example 19 is system comprising: at least one data processor; a memory; and a distortion filter, executable by the data processor to remove distortion from one or more images, where the one or more images represent a status in the fabrication of a semiconductor chip, the status corresponds to a stage in the fabrication, and the one or more images comprise scanning electron microscopy (SEM) images; a feature generator, executable by the data processor to: extract actual features from the one more images after removal of the distortion, where the actual features are observable from the one or more images; generate synthesized ideal features of the semiconductor chip associated with completion of the stage in the fabrication from the one or more images; an anomaly detector, executable by the data processor to: compare the actual features to the ideal features to determine whether anomalies associated with the stage exist in the semiconductor chip.

Example 20 may include the subject matter of example 19, where the distortion filter is further executable to determine whether any distortion remains in the one or more images; the anomaly detector is to determine whether anomalies exist by: aligning the extracted features to the ideal features; calculating deviations between the extracted features and ideal features; determining metrics based on the deviations, where the anomalies are determined based on the metrics; and classifying the anomalies according to a set of clusters using an unsupervised learning algorithm.

What is claimed is:

1. At least one non-transitory machine-readable storage medium with instructions stored thereon, wherein the instructions are executable by a machine to cause the machine to:
   receive an input, wherein the input comprises one or more images representing a status in a fabrication of a semiconductor chip, wherein the status corresponds to a stage in the fabrication;
   remove distortion from the one or more images to generate refined versions of the one or more images;
   extract actual features of the semiconductor chip as observed from the one more images, wherein the actual features comprise geometric patterns formed in the semiconductor chip following the stage of the fabrication;
   determine synthesized ideal features for the semiconductor chip associated with completion of the stage in the fabrication from the refined versions of the one or more images; and
   compare the actual features to the synthesized ideal features to determine whether anomalies associated with the stage exist in the semiconductor chip.

2. The storage medium of claim 1, wherein the determination of the synthesized ideal features comprises using historical data to determine the synthesized ideal features from the one or more images.

3. The storage medium of claim 1, wherein the determination of the synthesized ideal features comprises using a design layout for the semiconductor chip to determine the synthesized ideal features from the one or more images.

4. The storage medium of claim 1, wherein the extraction of actual features comprises detecting contours visible on the one or more images.

5. The storage medium of claim 4, wherein the contours are detected based on differing colors in the one or more images.

6. The storage medium of claim 1, wherein the instructions are further executable to cause the machine to compare a first location of each actual feature on the one or more images with a second location of each of the synthesized ideal features on the one or more images.

7. The storage medium of claim 6, wherein the instructions are further executable to cause the machine to determine the type of distortion on one or more images by analyzing a pattern corresponding to the differences between the first location with the second location.

8. The storage medium of claim 1, wherein the instructions are further executable to cause the machine to:
   determine whether any distortion remains in the one or more images, and
   align the extracted features to the synthesized ideal features.

9. The storage medium of claim 8, wherein the instructions are further executable to cause the machine to calculate deviations between the aligned extracted features and synthesized ideal features, wherein the deviations comprise at least one difference between the extracted feature and the corresponding synthesized ideal feature.

10. The storage medium of claim 1, wherein the fabrication comprises a plurality of processing steps and the stage corresponds to completion of one of the plurality of processing steps.

11. The storage medium of claim 10, wherein the semiconductor chip is to be fabricated based on a chip layout design, fabrication of the semiconductor chip remains incomplete following completion of the processing step, the synthesized ideal features of the semiconductor chip represent a predicted appearance of at least a portion of the semiconductor chip following completion of the processing step, and the predicted appearance differs from a finished appearance defined in the chip layout design.

12. The storage medium of claim 1, wherein the instructions are further executable to cause the machine to classify the anomalies in one of a plurality of classifications.

13. The storage medium of claim 12, wherein the anomalies are classified according to an unsupervised clustering algorithm.

14. The storage medium of claim 1, wherein the one or more images are obtained using scanning electron microscopy.

15. A method comprising:
receiving an input, wherein the input comprises one or more images representing a status in the fabrication of a semiconductor chip, wherein the status corresponds to a stage in the fabrication;
removing distortion from the one or more images;
extracting actual features of the semiconductor chip as observed from the one or more images;
determining synthesized ideal features for the semiconductor chip associated with the completion of the stage in the fabrication from the one or more images; and
comparing the actual features to the synthesized ideal features to determine whether anomalies associated with the stage exist in the semiconductor chip.

16. The method of claim 15, wherein the one or more images are obtained using scanning electron microscopy.

17. The method of claim 15, further comprising:
determining whether any distortion remains in the one or more images, and
aligning the extracted features to the synthesized ideal features.

18. The method of claim 17, further comprising:
classifying the anomalies in one of a plurality of classifications;
wherein the anomalies are classified according to an unsupervised cluster algorithm.

19. A system comprising:
at least one data processor;
a memory; and
a distortion filter, executable by the data processor to remove distortion from one or more images, wherein the one or more images represent a status in the fabrication of a semiconductor chip, the status corresponds to a stage in the fabrication, and the one or more images comprise scanning electron microscopy (SEM) images;
a feature generator, executable by the data processor to:
extract actual features from the one more images after removal of the distortion, wherein the actual features are observable from the one or more images;
generate synthesized ideal features for the semiconductor chip associated with completion of the stage in the fabrication from the one or more images;
an anomaly detector, executable by the data processor to:
compare the actual features to the synthesized ideal features to determine whether anomalies associated with the stage exist in the semiconductor chip.

20. The system of claim 19, wherein:
the distortion filter is further executable to determine whether any distortion remains in the one or more images;
the anomaly detector is to determine whether anomalies exist by:
aligning the extracted features to the synthesized ideal features;
calculating deviations between the extracted features and synthesized ideal features;
determining metrics based on the deviations, wherein the anomalies are determined based on the metrics; and
classifying the anomalies according to a set of clusters using an unsupervised learning algorithm.

* * * * *